United States Patent
Wootton et al.

(10) Patent No.: US 10,810,672 B2
(45) Date of Patent: Oct. 20, 2020

(54) SYSTEM AND METHOD FOR DYNAMIC RISK MANAGEMENT

(71) Applicant: JPMorgan Chase Bank, N.A., New York, NY (US)

(72) Inventors: Christine Pleiman Wootton, New York, NY (US); Lynn Adrienne Avitabile, Glastonbury, CT (US); Daniel Paul Oldroyd, Little Silver, NJ (US); Katherine Ann Stallkamp Santiago, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 732 days.

(21) Appl. No.: 14/839,048

(22) Filed: Aug. 28, 2015

(65) Prior Publication Data

US 2016/0063631 A1    Mar. 3, 2016

Related U.S. Application Data

(60) Provisional application No. 62/043,863, filed on Aug. 29, 2014.

(51) Int. Cl.
*G06Q 40/06* (2012.01)
(52) U.S. Cl.
CPC .................. *G06Q 40/06* (2013.01)
(58) Field of Classification Search
CPC ...................................... G06Q 40/06
USPC ........................................ 705/36 R
See application file for complete search history.

(56) References Cited

U.S. PATENT DOCUMENTS

| | | | | |
|---|---|---|---|---|
| 8,170,935 | B2* | 5/2012 | Weber | G06Q 40/06 705/35 |
| 8,396,775 | B1* | 3/2013 | Mindlin | G06Q 40/06 705/35 |
| 9,633,395 | B2* | 4/2017 | Ameriks | G06Q 40/00 |
| 2007/0005477 | A1* | 1/2007 | McAtannney | G06Q 40/06 705/35 |
| 2010/0131425 | A1* | 5/2010 | Stolerman | G06Q 10/067 705/36 R |

OTHER PUBLICATIONS

IBM Periodicals : IBM Journal of Research and Development. ISSN 0018-8646. Author Subramarian et al. (Year: 2010).*

* cited by examiner

*Primary Examiner* — Bruce I Ebersman
*Assistant Examiner* — John A Anderson
(74) *Attorney, Agent, or Firm* — Greenblum & Bernstein, P.L.C.

(57) ABSTRACT

A network interface receives portfolio data related to an investment plan portfolio of a participant. A processor identifies a first plurality of risk factors associated with market conditions, wherein the first plurality of risk factors comprises a future data and risk strength. The processor further identifies a second plurality of risk factors associated with the participant. The processor then generates glide path data based at least partially on the first plurality of risk factors and the second plurality of risk factors. The processor also generates a glide path map based at least partially on the generated glide path data.

15 Claims, 3 Drawing Sheets

SYSTEM AND METHOD FOR DYNAMIC RISK MANAGEMENT

RELATED APPLICATIONS

This application claims priority to U.S. Provisional Patent Application Ser. No. 62/043,863 entitled "SYSTEM AND METHOD FOR DYNAMIC RISK MANAGEMENT," which was filed on Aug. 29, 2014. U.S. Provisional Patent Application Ser. No. 62/043,863 is hereby incorporated by reference.

TECHNICAL FIELD

This invention relates generally to risk management, and, more particularly, to dynamic risk management.

BACKGROUND

The risks facing investors today are often dynamic and multi-faceted, and should be considered by asset managers in varying degrees across an individual's investing life. Participants in investment plans, such as defined contribution plans, face a multitude of risks that include rising inflation, fluctuating interest rates, and market volatility, as well as personal risks related to the participant, such as the participant outliving his or her assets and making poor investment decisions. While investment allocation strategies have traditionally focused on asset classes and risk/return profiles, such strategies have lacked outcome focus by failing to address the broader set of risks faced by the participants.

SUMMARY OF EXAMPLE EMBODIMENTS

According to embodiments of the present disclosure, disadvantages and problems associated with dynamic risk management may be reduced.

In certain embodiments, a network interface receives portfolio data related to an investment plan portfolio of a participant. A processor identifies a first plurality of risk factors associated with market conditions, wherein the first plurality of risk factors comprises a future data and risk strength. The processor further identifies a second plurality of risk factors associated with the participant. The processor then generates glide path data based at least partially on the first plurality of risk factors and the second plurality of risk factors. The processor also generates a glide path map based at least partially on the generated glide path data.

Certain embodiments of the present disclosure may provide one or more technical advantages. A technical advantage of one embodiment includes providing a graphical display that allows an asset manager and/or a participant to quickly assess a recommended change in the allocation ratio of assets in an investment plan portfolio based on various risk factors. Another technical advantage includes instantaneously updating the recommended change in the allocation ratio of assets in an investment plan portfolio when risk factors are altered. Another technical advantage includes improving the efficiency of network resource usage by accumulating the portfolio data of a participant's investment plan portfolio and risk factors in one module. Furthermore, by generating a glide path map in a centralized location, an organization may further experience efficiency in other resources, such as computing resources.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION

Figure 1:
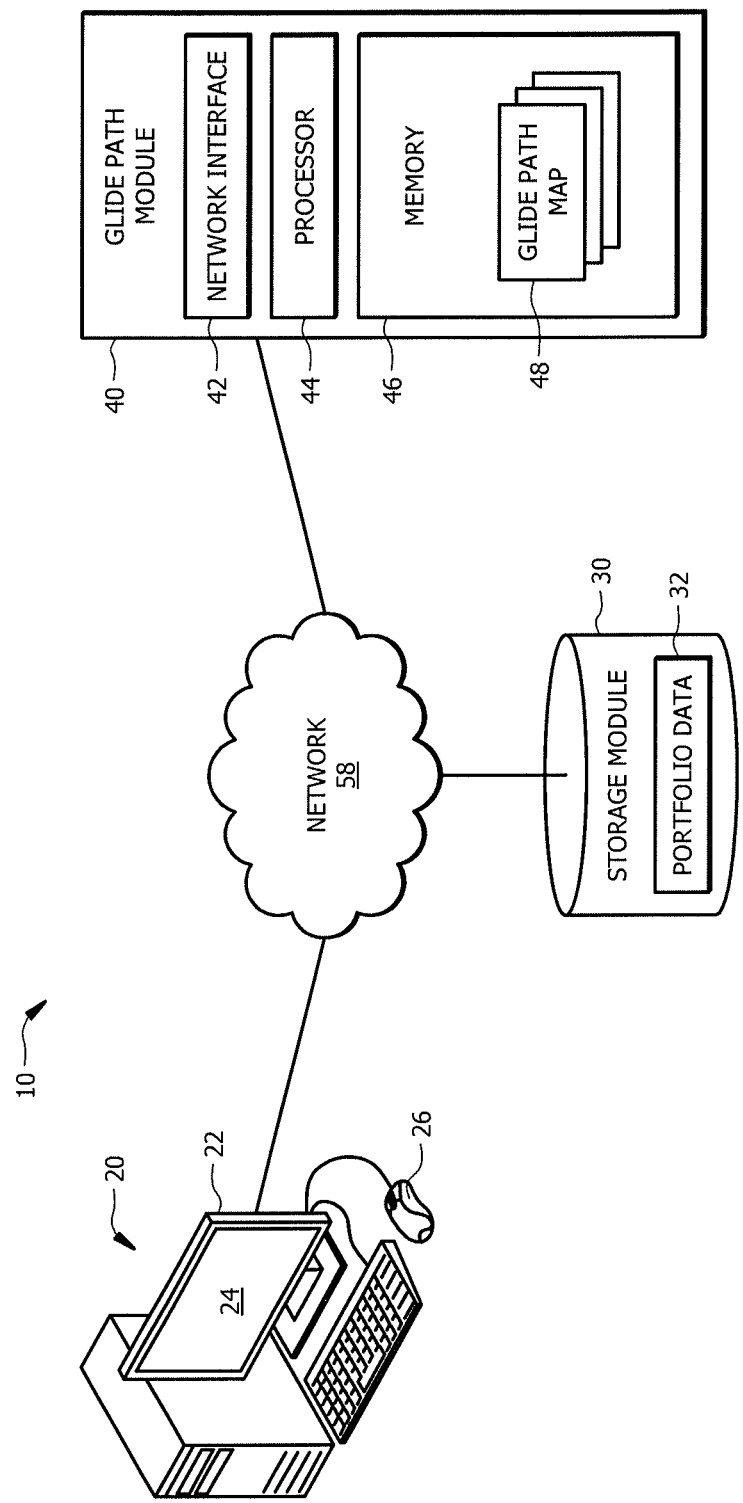
FIG. 1 illustrates an example system for generating a glide path map and risk ratings, according to certain embodiments of the present disclosure.
Figure 2:
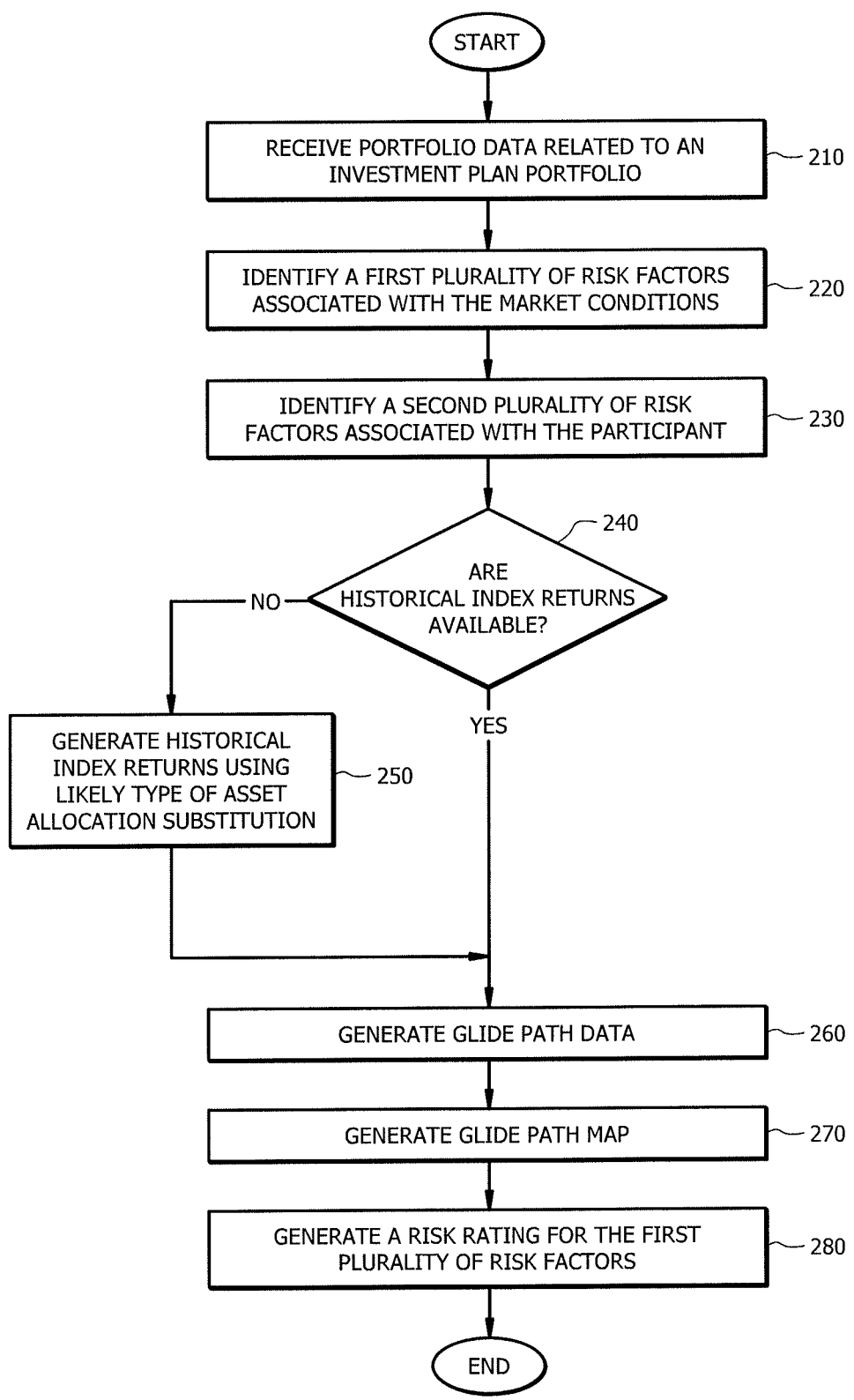
FIG. 2 illustrates an example method for generating a glide path map and a risk rating for the first plurality of risk factors, according to certain embodiments of the present disclosure.
Figure 3:
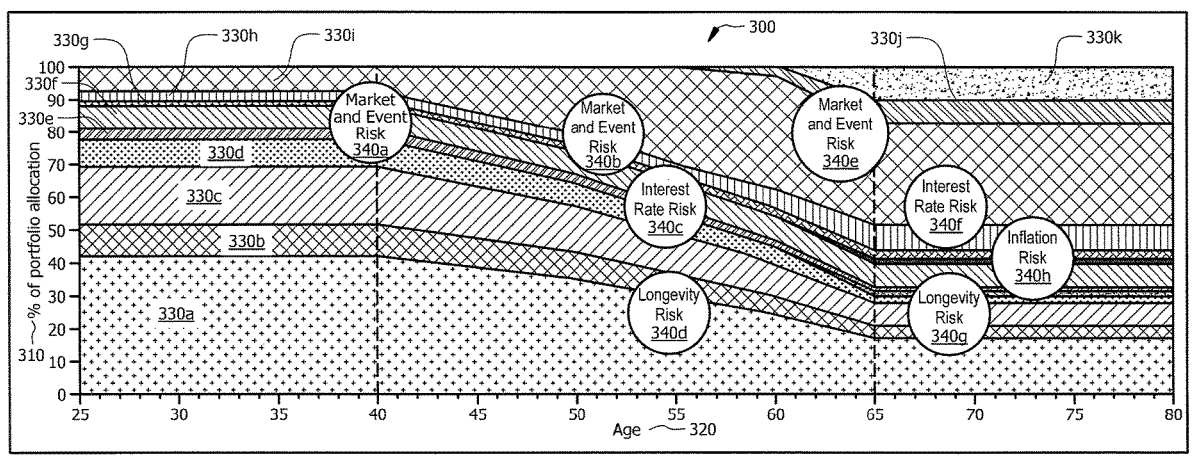
FIG. 3 illustrates an example glide path map, according to certain embodiments of the present disclosure.

Embodiments of the present invention and its advantages are best understood by referring to FIGS. 1 through 3 of the drawings, like numerals being used for like and corresponding parts of the various drawings.

The risks facing investors today are often dynamic and multi-faceted, and should be considered by asset managers in varying degrees across an individual's investing life. Participants in investment plans, such as defined contribution plans, face a multitude of risks that include rising inflation, fluctuating interest rates, and market volatility, as well as personal risks related to the participant, such as the participant outliving his or her assets and making poor investment decisions. While investment allocation strategies have traditionally focused on asset classes and risk/return profiles, such strategies have lacked outcome focus by failing to address the broader set of risks faced by the participants.

Therefore, it is advantageous to provide a system and method for managing risk in an investment plan portfolio of assets. The embodiments described herein provide a way to help advisors, consultants, and investment plan sponsors (collectively, "portfolio advisors") identify how and when to manage various investor risks given their unique participant behavior and demographics. Such risks may include participant-related risks, such as accumulation risk (e.g., failure to save enough money), participant-user risk (e.g., possibility that the participant misuses investment options), and withdrawal risk (e.g., risk of needing to withdraw funds prior to retirement). Moreover, these risks may also include participant-experienced risks, such as longevity risks (e.g., risk participant will outlive savings), market risk (e.g., risk of drawdown as one approaches retirement), event risk (e.g., risk of severe loss due to a market event), interest rate risk (e.g., risk that fixed income securities will lose value if rates rise), and inflation risk (e.g., risk that value of principal will be eroded by inflation). In outlining these risks, various client archetypes may be defined to help direct clients (as well as their consults and advisors) to an appropriate investment solution given their unique circumstances.

FIG. 1 illustrates a black diagram of an embodiment of system 10 for generating glide path map 48 and risk ratings. System 10 includes one or more terminal systems 20, one or more storage modules 30, and glide path module 40 to facilitate generating glide path map 48 and risk ratings. Terminal systems 20, storage modules 30, and glide path module 40 may communicate over one or more networks 50.

System 10 includes terminal system 20. Typically, an investment plan portfolio advisor controls terminal system 20 to generate glide path map 48 and risk ratings for a client's portfolio; however, a client may also use terminal system 20 to view glide path map 48 and risk ratings for their own portfolio. In certain embodiments, terminal system 20 communicates the data related to an investment plan portfolio of a participant to glide path module 40. Specifically, the data describes the allocation ratios of a plurality of assets of the investment plan portfolio.

Generally an investment plan portfolio is a mixture of investments people use to grow funds to cover their retirement needs. Typically, a person uses assets to fund an investment plan portfolio. These assets are typically distributed across various investments to distribute risk. Each investment plan portfolio asset is considered an allocation. The allocation ratio is the percentage of an asset that is invested to a particular investment. Generally, the sum of the allocation ratios of all the investments in an investment plan portfolio will be 100%.

An investment plan portfolio contains a principal. Typically, an investment plan portfolio will grow over the course of the year through various investments. The principal is the value of the investment plan portfolio before the growth over the year. Accordingly, at the end of the year, the investment plan portfolio will contain the principal plus the gains or minus the losses in the investment plan portfolio from the various investments.

An investment plan portfolio may also have a historical index return. The historical index return provides a backward-looking view of how an investment plan portfolio performed in the past. The historical index return is generally based on index series associated with the investment plan portfolio. If the historical index return is not available for a certain time period, glide path module 40 may determine a historical index return for that time period using the most likely type of asset allocation substitution. Typically, terminal system 20 provides a historical index return for an investment plan portfolio to glide path module 40.

Terminal system 20 may be implemented using any suitable type of processing system and may include any suitable combination of hardware, firmware, and software. Terminal system 20 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Terminal system 20 may be a stand-alone computer or may be part of a larger network of computers associated with an entity.

Terminal system 20 may include user display 22, which may include any suitable device operable to visually present information to a user. User display 22 may present a graphical user interface ("GUI") 24, which may comprise a visual interface operable to allow a user to interface with terminal system 20. Generally, GUI 24 provides the user with an efficient and user-friendly presentation of data provided by system 10, such as charts, tables and other information. GUI 24 may comprise a plurality of displays having interactive fields, pull-down lists, and buttons operated by the user. In one example, GUI 24 presents multiple charts and tables according to specification by the user and receives commands from the user. Further, GUI 24 contemplates any graphical user interface, such as a generic web browser, that processes information in system 10 and efficiently presents the information to the user. Terminal system 20 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Terminal system 20 may include input device 26. Input device 26 allows a user to interact with glide path module 40 through terminal system 20. Input device 26 may comprise any user interface, such as a display, keyboard, mouse, or other appropriate terminal equipment.

Terminal system 20 may interact with glide path module 40 to generate glide path map 48. For example, terminal system 20 communicates portfolio data 32 related to an investment plan portfolio of a participant to glide path module 40. In certain embodiments, glide path module 40 generates a formatted portfolio data 32 related to a participant's portfolio using the received portfolio data 32. As another example, terminal system 20 may communicate with glide path module 40 to display generated glide path map 48 on GUI 24. A user may view and otherwise interact with generated glide path map 48 using terminal system 20.

As described above, system 10 may include storage module 30, which may store portfolio data 32. Storage module 30 may include any one or a combination of volatile or non-volatile local or remote devices suitable for storing information. For example, storage module 30 may include random access memory (RAM), read only memory (ROM), magnetic storage devices, optical storage devices, or any other suitable information storage device or a combination of these devices. Storage module 30 may be part of or distinct from terminal system 20 and/or glide path module 40. Although storage module 30 is illustrated and described as storing particular information, a portion or all of that information may be stored in memory 56 or another suitable location. In certain embodiments, storage module 30 pushes portfolio data 32 to glide path module 40. In other embodiments, glide path module 40 may access storage module 30 to collect portfolio data 32. For example, glide path module 40 may query storage module 30 to collect portfolio data 32.

Storage module 30 may store portfolio data 32. Portfolio data 32 may include information for use by glide path module 40 in generating glide path map 48 and associated risk ratings. For example, portfolio data 32 may include information related to the investment plan portfolio of the participant. As a more particular example, portfolio data 32 may describe the allocation ratios of assets of the investment plan portfolio. Typically, portfolio data 32 contains both the asset and its corresponding allocation ratio. Example assets include stocks, government bonds, corporate bonds, Treasury bills, real estate investment trusts, exchange-traded funds, mutual funds, certificates of deposit, options, derivatives such as futures, and physical investments like commodities, real estate, land and timber. In certain embodiments, the asset may include a category of assets, such as stocks or physical investments.

Glide path module 40 represents any suitable component that facilitates accessing portfolio data 32 from storage module 30 to generate glide path map 48 and associated risk ratings for terminal system 20. Glide path module 40 may include a network server, any suitable remote server, a mainframe, a host computer, a workstation, a web server, a personal computer, a file server, or any other suitable device operable to communicate with terminal system 20 and/or storage module 30. In some embodiments, glide path module 40 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of glide path module 40 may be performed by any suitable combination of one or more servers or other components at one or more locations. In the embodiment where glide path module 40 is a server, the server may be a private server, or the server may be a virtual or physical server. The server may include one or more servers at the same or remote locations. Also, glide path module 40 may include any suitable component that functions as a server. In the illustrated embodiment, glide path module 40 includes a network interface 42, a processor 44, and a memory 46.

Network interface 42 represents any suitable device operable to receive information from network 50, transmit information through network 50, perform processing of information, communicate with other devices, or any combination of the preceding. For example, network interface 42 communicates the generated glide path heat map and risk ratings to terminal system 20. Network interface 42 represents any port or connection, real or virtual, including any suitable hardware and/or software, including protocol conversion and data processing capabilities, to communicate through a local area network (LAN), wide area network (WAN), or other communication system that allows glide path module 40 to exchange information with terminal system system 20, storage module 30, network 50, or other components of system 10.

Processor 44 communicatively couples to network interface 42 and memory 46, and controls the operation and administration of glide path module 40 by processing information received from network interface 42 and memory 46. Processor 44 includes any hardware and/or software that operates to control and process information. Processor 44 may be a programmable logic device, a microcontroller, a microprocessor, any suitable processing device, or any suitable combination of the preceding.

Memory 46 stores, either permanently or temporarily, data, operational software, or other information for processor 44. For example, memory 46 may store glide path map 48. Memory 46 includes any one or a combination of volatile or non-volatile local or remote devices suitable for storing information. For example, memory 46 may include RAM, ROM, magnetic storage devices, optical storage devices, or any other suitable information storage device or a combination of these devices. Memory 46 may store portfolio data 32, glide path data for the participant's investment plan portfolio and/or other investment plan portfolios, and other data accessed by glide path module 40.

Memory 46 may store glide path map 48. Glide path map 48 is a visual representation of glide path data. An example glide path map is illustrated in FIG. 3. Typically, glide path map 48 is illustrated as an area graph. The areas in the area graph correspond to the allocation ratio of the plurality of assets over time. As time progresses, the allocation ratio of the plurality of assets will also change with time. Glide path map 48 may also graphically illustrate the first plurality of risks in glide path map 48 to illustrate when the risk will occur and also the strength of the risk. Typically, the allocation ratio change of the plurality of assets will change more abruptly during these risks. In addition, project map module 40 may contain multiple glide path maps 48. For example, glide path module 40 may store glide path maps 48 for previously-created glide path data. In an exemplary embodiment, glide path module 40 may generate and store glide path map 48 for popular investment plan portfolios in order to compare the popular investment plan portfolio's glide path maps 48 with the currently-generated glide path map 48.

Network 50 facilitates communications between terminal system 20, storage module 30, glide path module 40, and any other components in system 10. This disclosure contemplates any suitable network 50 operable to facilitate communication between the components of system 10. Network 50 may include any interconnecting system capable of transmitting audio, video, signals, data, messages, or any combination of the preceding. Network 50 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 50.

In an exemplary embodiment of operation, glide path module 40 receives portfolio data 32. In certain embodiments, storage module 30 communicates portfolio data 32 to glide path module 40. Portfolio data 32 may include data related to an investment plan portfolio of a participant. Portfolio data 32 may provide data that describes the allocation ratio of a plurality of assets in the investment plan portfolio.

An investment plan portfolio represents a type of defined contribution model. Typically, an investment plan portfolio is a target date fund that reallocates assets over the course of the investment plan portfolio length. The managers of different portfolios may employ significant differences in asset allocation, portfolio construction, and equity exposure. These differences can have implications for a strategy's risk/reward characteristics and expected potential retirement outcomes. In addition, the portfolio managers may emphasize protecting against a specific type of risk over other types of risk. For example, some portfolio managers may prioritize longevity risk, while others may stress market risk. Although most portfolios offer diversification benefits, skewing the allocation to prevent a particular type of risk may heavily elevate risks in other key areas. This, in turn, can introduce unintended consequences that may result in greater uncertainty as various risks ebb and flow at various times.

Every investment portfolio contains some type of risk. A risk to an investment plan portfolio is any uncertainty with respect to the investment plan portfolio that has the potential to negatively affect the portfolio itself. Risks associated with an investment plan portfolio can fall into two general categories: participant-controlled risks and participant-experienced risks. Participant-controlled risks cover areas that hinge on participant behavior. These include accumulation risk, participant-user risk, and withdrawal risks. Generally, portfolio advisors cannot control participant-controlled risks, such as how much a participant contributes, how a participant invests those assets, or when the participant makes withdrawals. On the other hand, participant-experienced risks are caused by factors that are largely out of the participant's control. These include longevity risk, market risk, event risk, inflation risk, and interest rate risk. Portfolio advisors may address these types of risks through a participant's asset allocation choices. Over the course of any participant's portfolio length of time, the participant-experienced risk may be experienced to some degree. Because participant-controlled and participant-experienced risks can change over time, an investment plan portfolio requires ongoing monitoring to assess if it may also need to evolve in responses to these changes.

Listed below are the various participant-controlled risks and participant-experienced risks with an explanation of the risks.

Participant-Controlled Risks
  Accumulation Risk: Risk that the participant will outlive the principal of the investment plan portfolio.
  Participant-User Risk: Risk that the participant misuses his or her investment options.
  Withdrawal Risk: Risk of needing to withdraw funds prior to retirement.
Participant-Experienced Risks
  Longevity Risk: Longevity risk generally refers to the concern that a participant will outlive the assets of the investment plan portfolio. Portfolios that prioritize longevity risks usually maintain significantly greater allocation to equities and other higher/risk reward assets in the final years of the investment plan portfolio's life. Longevity risk may comprise a future date and a longevity risk strength. The future date of the longevity risk may indicate a date in which a longevity risk may occur. Typically, the future date of the longevity risk is measured as the age at which the investment plan portfolio depletes to zero after market returns are combined with annual withdrawals. In certain embodiments, glide path module 40 assumes a flat 4% to 5% withdrawal to calculate a longevity risk target date and risk strength. In exemplary embodiments, glide path module 40 calculates the longevity risk target date and risk strength based on an implied rate of withdrawal according to an income replacement a participant will likely need in retirement.
  Market Risk: Market risk generally refers to declines in both equity markets and other higher risk assets that can negatively affect returns. Market risk may also entail both frequency and magnitude of potential losses, including general day-to-day volatility as well as severe market events (e.g., the burst of the tech bubble in 2000). Portfolios that prioritize market risks usually maintain a majority of holdings in higher risk/reward assets that become increasingly conservative as participants move toward the end of the investment plan portfolio's life. Market risk may comprise a future date and market risk strength. The future date of the market risk may indicate a date in which a market risk may occur. The market risk strength may indicate a size of a market loss. Glide path module 40 may also implement a Monte Carlo simulation to determine a likelihood percentage of a loss due to a market risk at the future date.
  Inflation Risk: Inflation risk generally refers to the chance that the investment plan portfolio will be negatively affected in the future because of changes in purchasing power due to inflation. Portfolios that prioritize inflation risk typically emphasize assets that have a direct relationship with inflation, such as real estate and commodities. Inflation risks may comprise a future date and an inflation risk strength. Glide path module 40 may determine the future and inflation risk strength using a historical return pattern that indicates the returns over different historical periods and the inflation rate at those same periods.
  Interest Rate Risk: Interest rate risk generally refers to an investment plan portfolio's sensitivity to rising interest rates. Portfolios that prioritize interest rate risk generally have larger fixed-income holdings. Interest rate risk may contain a future date and an inflation risk strength. Typically, glide path module 40 will calculate the interest rate risk's future date and risk strength based on portfolio's duration. In addition, glide path module 40 may also use a historical return pattern of the investment plan portfolio against historical periods where the interest rate rises and calculate the investment plan portfolio's returns based on the historical index return.

In certain embodiments, glide path module 40 may identify a first plurality of risk factors associated with the market conditions (i.e., participant-experienced risks). In an exemplary embodiment, glide path module 40 may determine the first plurality of risk factors by projecting future risks using the age of the participant and a forecasting model that predicts the date and strength future risks in the participant's lifetime. The first plurality of risk factors typically comprises a future date and risk strength. Glide path module 40 may also identify a second plurality of risk factors associated with the participant (i.e., participant-controlled risks). In an exemplary embodiment, glide path module 40 may determine the second plurality of risk factors by using information known to the portfolio advisor (such as amount of assets invested in the investment portfolio, previous withdrawals from investment portfolio, or the participant's credit rating) to determine the second plurality of risk factors. Terminal system 20 or storage module 30 may provide the risk factors to glide path module 40.

The risk factors associated with the market conditions may include an inflation risk (i.e., risk that a principal of the investment plan portfolio of the participant will be eroded by inflation), an interest rate risk (i.e., risk that fixed income securities will lose value if interest rates rise), a market risk (i.e., risk of capital losses or investment losses of the investment plan portfolio of the participant due to market volatility or asset class volatility), an event risk (i.e., risk of loss of the principal of the investment plan portfolio due to a market event), and a longevity risk (i.e., risk the participant will outlive the principal of the investment plan portfolio). Glide path module 40 may also identify a second plurality of risk factors associated with the participant. The risk factors associated with the participant may include a participant-user risk (i.e., a risk that the participant misuses a principal of the investment plan portfolio), a withdrawal rate risk (i.e., a risk that the participant withdraws the principal of the investment plan portfolio prior to retirement), and an accumulation risk (i.e., risk that the participant will outlive the principal of the investment plan portfolio).

In an exemplary embodiment, glide path module 40 may also determine a historical index return of the investment plan portfolio using historical data associated with the investment plan portfolio. In certain embodiments, the historical index return of the investment plan portfolio is based on a historical index series of the investment plan portfolio. Where the historical index series is unavailable for an investment plan portfolio, glide path module 40 may base the historical index return on the most likely asset allocation for the investment plan portfolio. Glide path module 40 may utilize historical index return to develop glide path data. Specifically, glide path module 40 may use the historical index return to forecast future potential returns of the investment portfolio especially in consideration of the plurality of risks. In addition, glide path module 40 may utilize the historical index return to complement the resulting glide path data from the Monte Carlo simulation. For example, glide path module 40 may adjust the future allocation ratios resulting from the Monte Carlo simulation based on the forecasted future potential returns of the investment portfolio due to the historical index return.

Using portfolio data 32, the first plurality of risk factors, the second plurality of risk factors, and the historical index return in certain embodiments, glide path module 40 may generate glide path data. The glide path data provides an outlook for the allocation ratio of the assets in a participant's investment plan portfolio against risk factors over the course of time. In exemplary embodiments, glide path module 40 utilizes a Monte Carlo simulation that factors in the first plurality of risk factors associated with the market conditions and a second plurality of risk factors associated with the participant to determine the future allocation ratio of a participant's investment plan portfolio. Specifically, the Monte Carlo simulation takes into account the date for the particular risk and the strength of that risk to generate glide path data. Monte Carlo simulation is a technique used to understand the impact of risk in financial forecasting models. In exemplary embodiments, glide path module 40 uses a long-term capital market assumption as a basis for the Monte Carlo simulation to generate glide path data. Long-term capital market assumptions comprise a long-term outlook for major asset classes and markets. An example long-term capital market assumption is J.P. MORGAN LONG-TERM CAPITAL MARKET ASSUMPTIONS. In addition, glide path module 40 may also complement the Monte Carlo simulation results with the historical index return of the investment plan portfolio. Specifically, glide path module 40 may utilize the historical index return to adjust the future allocation ratio of a participant's investment plan portfolio that resulted from the Monte Carlo simulation.

Glide path module 40 may make assumptions to generate glide path data. For instance, glide path module 40 may estimate an annual contribution rate prior to retirement of 10% of the participant's annual salary. At the point of retirement, glide path module 40 may assume that the contributions stop and that the participant will withdraw 6.5% of the portfolio annually.

Glide path module 40 may also generate glide path map 48. Glide path map 48 is a representation of the glide path data. An example glide path map is illustrated in FIG. 3. Typically, glide path map 48 is illustrated as an area graph. The areas in the area graph correspond to the allocation ratio of the plurality of assets over time. As time progresses, the allocation ratio of the plurality of assets will also change with time. Glide path map 48 may also graphically illustrate the first plurality of risks in glide path map 48 to illustrate when the risk will occur and also the strength of the risk.

Glide path module 40 may also determine risk ratings for the investment plan portfolio using the generated glide path and the specific date and strength of a certain risk. Glide path module 40 may determine a risk rating for each plurality of participant-experienced risks and also an overall risk rating for the investment plan portfolio. The following comprises the exemplary formulas that glide path module 40 uses to calculate the risk ratings for the first plurality of risk factors associated with the market conditions (i.e., participant-experienced risks):

Market risk rating: Average of the loss for rolling 3-year returns, worst 3-year return, and expected probability of loss of more than −10%.

Longevity risk rating: Average age of the investment plan portfolio when the investment plan portfolio depletes.

Event risk rating: Average of the probability of a risk of loss of the principal of the investment plan portfolio due to a market event.

Inflation risk rating: Average of the probability of return over one year for the life of the investment plan portfolio and during rising periods of inflation.

Interest rate risk rating: Average of a negative duration and a historical percentage loss of the investment plan portfolio.

Note that in certain embodiments, glide path module 40 may determine a rating for all, some, or none of the above ratings.

To determine a risk rank from the calculating risk rating, glide path module 40 compares the outcome of the ratings for each of the first plurality of risks to corresponding ratings for other generated glide paths. Specifically, the ratings for the generated glide path are compared to the ratings from previously-created glide paths. In an exemplary embodiment, glide path module 40 determines an index of ratings of popular investment plan portfolios to compare against the current glide path. Glide path module 40 determines a standard deviation of the current glide path to the previously-generated glide paths in order to generate a ranking for each risk. Moreover, glide path module 40 may calculate an overall glide path ranking by averaging the rankings of the first plurality of risks.

A component of system 10 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 10 without departing from the scope of the disclosure. For example, system 10 may include any number of terminal systems 20, storage modules 30, and glide path modules 40. Any suitable logic may perform the functions of system 10 and the components within system 10.

FIG. 2 illustrates an example method for generating glide path map 48 and a risk rating for the first plurality of risk factors. The method may be implemented in any suitable combination of software, firmware, and hardware, according to particular needs. Although particular components may be identified as performing particular steps, the present disclosure contemplates any suitable components performing the steps according to particular needs.

At step 210, glide path module 40 receives portfolio data 32 related to an investment plan portfolio. In certain embodiments, storage module 30 communicates portfolio data 32 to glide path module 40. Portfolio data 32 may include data related to an investment plan portfolio of a participant.

Portfolio data 32 may provide data that describes the allocation ratio of a plurality of assets of the investment plan portfolio.

Glide path module 40 identifies a first plurality of risk factors associated with the market conditions at step 220. The first plurality of risk factors typically comprises a future date and risk strength. The risk factors associated with the market conditions may include an inflation risk (i.e., risk that a principal of the investment plan portfolio of the participant will be eroded by inflation), an interest rate risk (i.e., risk that fixed income securities will lose value if interest rates rise), a market risk (i.e., risk of capital losses or investment losses of the investment plan portfolio of the participant due to market volatility or asset class volatility), an event risk (i.e., risk of loss of the principal of the investment plan portfolio due to a market event), and a longevity risk (i.e., risk the participant will outlive the principal of the investment plan portfolio).

Glide path module 40 may also identify a second plurality of risk factors associated with the participant at step 230. The risk factors associated with the participant may include a participant-user risk (i.e., a risk that the participant misuses a principal of the investment plan portfolio), a withdrawal rate risk (i.e., a risk that the participant withdraws the principal of the investment plan portfolio prior to retirement), and an accumulation risk (i.e., risk that the participant will outlive the principal of the investment plan portfolio).

At step 240, glide path module 40 determines if a historical index return is available for the investment plan portfolio. If a historical index return is available, the method proceeds to step 260. If a historical index return is not available, the method proceeds to step 250. At step 250, glide path module 40 determines a historical index return for the investment plan portfolio using the most likely type of asset allocation substitution for the investment plan portfolio during that historical period.

At step 260, glide path module 40 generates glide path data using portfolio data 32, the first plurality of risk factors, the second plurality of risk factors, and the historical index return in certain embodiments. In exemplary embodiments, glide path module 40 utilizes a Monte Carlo simulation that factors in the first plurality of risk factors associated with the market conditions and a second plurality of risk factors associated with the participant to determine the future allocation ratio of participant's investment plan portfolio. Specifically, the Monte Carlo simulation takes into account the date for the particular risk and the strength of that risk to generate glide path data. In exemplary embodiments, glide path module 40 uses a long-term capital market assumption as a basis for the Monte Carlo simulation to generate glide path data. In addition, glide path module 40 may also complement the Monte Carlo simulation results with the historical index return of the investment plan portfolio. Specifically, glide path module 40 may utilize the historical index return to adjust the future allocation ratio of a participant's investment plan portfolio that resulted from the Monte Carlo simulation.

Glide path module 40 generates glide path map 48 at step 270. Glide path map 48 is a representation of the glide path data. An example glide path map is illustrated in FIG. 3. Typically, glide path map 48 is illustrated as an area graph. The areas in the area graph correspond to the allocation ratio of the plurality of assets over time. As time progresses, the allocation ratio of the plurality of assets will also change with time. Glide path map 48 may also graphically illustrate the first plurality of risks in glide path map 48 to illustrate when the risk will occur and also the strength of the risk.

At step 280, glide path module 40 may also generate a risk rating for the first plurality of risk factors using portfolio data 32 and the historical index return in certain embodiments. Typically, glide path module 40 uses the generated glide path and the specific date and strength of a certain risk to determine a risk rating for that particular risk. Glide path module 40 may determine a risk rating for each plurality of participant-experienced risks and also an overall risk rating for the investment plan portfolio.

Modifications, additions, or omissions may be made to the method depicted in FIG. 2. The method may include more, fewer, or other steps. Additionally, steps may be performed in parallel or in any suitable order. While described as glide path module 40 performing the steps, any suitable component of system 10 may perform one or more steps of the method.

FIG. 3 is an example glide path map 300 generated by glide path module 40. Glide path map 300 may be generated by glide path module 40 and displayed on terminal system 20 (e.g., GUI 24). In the illustrated embodiment, glide path map 300 includes portfolio allocation axis 310, age axis 320, asset indicators 330, and risk factor indicators 340. Glide path module 40 may generate glide path map 300 in order for a viewer to visualize the changes in the allocation ratio of the portfolio over the course of times as various risks are presented.

Portfolio allocation axis 310 represents the vertical axis of glide path map 300. Typically portfolio allocation axis 310 indicates the percentage of portfolio allocation to a particular asset. Portfolio allocation axis 310 may be any measurement that provides a reference line to the particular allotment of an asset or assets in a participant's investment plan portfolio.

Age axis 320 represents the horizontal axis of glide path map 300. In the illustrated embodiment, age axis 320 represents the age of the participant in the future. Age axis 320 may be any measurement that provides a reference line to the date that provides a user an indication of the allocation of asset and/or risk at a particular time.

Asset indicators 330 represent assets in a participant's investment plan portfolio at a particular time. Example assets include stocks, government bonds, corporate bonds, Treasury bills, real estate investment trusts, exchange-traded funds, mutual funds, certificates of deposit, options, derivatives such as futures, and physical investments like commodities, real estate, land and timber. Each particular asset, 330a-330k, represents a specific asset in a participant's investment portfolio. In the exemplary embodiment of the area graph, the area represents a percentage of the participant's investment plan that contains the particular asset at that time frame. For example, in the illustrated embodiment, asset 330a is approximately 32% of the participant's investment plan portfolio from the age of twenty-five to forty. By using the area graph, a viewer of glide path map 300 can view the changes in the allocation ratio of the assets especially in light of the plurality of risks.

Risk factor indicators 340 represent risks that can occur during a participant's lifetime, and are a representation of the first plurality of risk factors (i.e., participant-experienced risks). Each particular risk factor, 340a-340h, represents a risk that can occur during age axis 320. In the illustrated embodiment, the circle placement of risk factor indicator 340 represents the time that risk factor indicators 340 will occur and the diameter of the circle indicates the strength of the risk factor. For example, interest rate risk 340c is a smaller strength risk than market and event risk factor 340e because the diameter of interest rate risk 340c is smaller than the diameter of event risk factor 340e. As illustrated, the strength of particular risk factor indicators 340 may change in strength over time. This change may impact the percentage of portfolio allocation to a particular asset or assets, along with other factors as previously discussed. A viewer of glide path map 300 can easily view the changing allocations in asset indicators 330 in relation to risk factor indicators 340. In particular, a viewer of glide path map 300 can view how the investment plan changes the allocation in asset indicators 330 to particular risk factor indicators 340. This is particularly important when a participant is concerned about a particular type of risk over another type of risk.

Modifications, additions, or omissions may be made to glide path map 300 without departing from the scope of the disclosure.

Certain embodiments of the present disclosure may provide one or more technical advantages. A technical advantage of one embodiment includes providing a graphical display that allows an asset manager and/or a participant to quickly assess a recommended change in the allocation ratio of assets in an investment plan portfolio based on various risk factors. Another technical advantage includes instantaneously updating the recommended change in the allocation ratio of assets in an investment plan portfolio when receiving updated risk factors to consider. Another technical advantage includes improving the efficiency of network resource usage by accumulating the allocation ratio of assets in an investment plan portfolio and risk factors in one module. Furthermore, by generating a glide path map in a centralized location, an organization may further experience efficiency in other resources, such as computing resources.

Although the present invention has been described with several embodiments, a myriad of changes, variations, alterations, transformations, and modifications may be suggested to one skilled in the art, and it is intended that the present invention encompass such changes, variations, alterations, transformations, and modifications fall within the scope of the appended claims.

What is claimed is:

1. A system for simulating an investment plan portfolio of a participant and a plurality of risk factors, detecting a change in risk factors, and managing risk in the investment plan portfolio, the system comprising:
    a storage module having portfolio data related to the investment plan portfolio, the portfolio data including allocation ratios of a plurality of assets of the investment plan portfolio;
    a glide path module including a processor operably connected to the storage module for accessing the portfolio data to model the investment plan portfolio; and
    a network that establishes communication between the storage module and the glide path module,
    wherein the processor is configured to:
    define first risk factors associated with market conditions including a future date and a risk strength;
    define second risk factors associated with the participant;
    display a change in the allocation ratios of the plurality of assets as a function of time based on the first risk factors and the second risk factors resulting in glide path data;
    generate a glide path map based on the resulting glide path data, wherein the glide path map provides a visual depiction of a change in the allocation ratios of the plurality of assets over time, and wherein the glide path map includes an area graph including:
        a plurality of areas corresponding to the plurality of assets, wherein the plurality of areas present the allocation ratios of the plurality of assets as a function of time; and
        a plurality of risk factor indicators overlaying the plurality of areas, wherein the plurality of risk factor indicators indicate the future date as a function of time and the risk strength;
    generate a graphical display onto a graphical user interface (GUI) configured to provide a visual depiction of the glide path map and a recommended change in the allocation ratios of the plurality of assets to the participant, wherein the visual depiction of the glide path map illustrates various risks by corresponding representation of a circle, wherein the diameter of the circle is proportionally related to the strength of the risk factor, wherein the diameter of a particular risk factor is configured to change proportionally as the strength of a particular risk factor changes over time, and wherein the processor is configured to calculate risk ratings for the investment portfolio using the generated glide path and specific date and strength of a certain risk and determine a risk rank from the calculated risk rating;
    monitor the first risk factors and the second risk factors to identify a change in the first risk factors and the second risk factors;
    identify a change in at least one of the first risk factors or the second risk factors;
    update the allocation ratios of the plurality assets based on the identified change in at least one of the first risk factors or the second risk factors and display an updated glide path map based on the updated allocation ratios of the plurality of assets;
    accumulate the allocation ratios of assets in the investment plan portfolio and risk factors in one module thereby improving network resource usage efficiency; and
    generate the glide path map in a centralized location of the system, and wherein the processor is further configured to:
    generate a historical index return for the investment plan portfolio based on at least one asset allocation for the investment plan portfolio;
    forecast future potential returns of the investment portfolio based on the historical index return for the investment plan portfolio and at least one of the first risk factors or second risk factors;
    calculate the change in the allocation ratios of the plurality of assets as a function of time based on the first risk factors, the second risk factors, and a Monte Carlo simulation resulting in the glide path data;
    adjust any future allocation ratios resulting from the Monte Carlo simulation calculation based on the forecasted future potential returns of the investment portfolio; and
    display the allocation ratios on the GUI based on the adjustment.

2. The system of claim 1, wherein the first risk factors associated with the market conditions comprises:
    an inflation risk indicating a risk that a principal of the investment plan portfolio will be eroded by inflation;
    an interest rate risk indicating a sensitivity of the investment plan portfolio to rising interest rates;
    a market risk indicating a risk of a capital loss or an investment loss to the investment plan portfolio of the participant due to market volatility;

an event risk indicating a risk of loss of the principal of the investment plan portfolio due to a market event; and a longevity risk indicating a risk the participant will outlive the plurality of assets of the investment plan portfolio.

3. The system of claim 2, wherein the processor is further configured to:

generate an inflation risk rating based on the glide path data and the inflation risk; generate an interest rate risk rating based on the glide path data and the interest rate risk; generate a market risk rating based on the glide path data and the market risk; generate an event risk rating based on the glide path data and the event risk; and generate a longevity risk rating based on the glide path data and the longevity risk.

4. The system of claim 1, wherein the second risk factors associated with the market condition comprises:

a participant-user risk indicating a risk that the participant misuses a principal of the investment plan portfolio;

a withdrawal rate risk indicating a risk that the participant withdraws the principal of the investment plan portfolio prior to retirement; and an accumulation risk indicating a risk that the participant will outlive the principal of the investment plan portfolio.

5. The system of claim 1, wherein the processor is further configured to:

access a historical index return for the investment plan portfolio, via the storage module; and calculate the change in the allocation ratios of the plurality of assets as a function of time based on the first risk factors, the second risk factors, and the historical index return for the investment plan portfolio resulting in the glide path data.

6. A method for simulating an investment plan portfolio of a participant and a plurality of risk factors, detecting a change in risk factor, and managing risk in the investment plan portfolio comprising:

accessing, via a graphical user interface (GUI), portfolio data related to the investment plan portfolio, the portfolio data including allocation ratios of a plurality of assets of the investment plan portfolio;

defining, by utilizing a computer processor, first risk factors associated with market conditions and including a future date and risk a strength;

defining, by utilizing the computer processor, second risk factors associated with the participant;

displaying, by utilizing the computer processor, a change in the allocation ratios of the plurality of assets as a function of time based on the first risk factors and the second risk factors resulting in glide path data;

generating, by utilizing the computer processor, a glide path map based on the resulting glide path data, the glide path map providing a visual depiction of the change in the allocation ratios of the plurality of assets over time, and wherein the glide path map includes an area graph including:

a plurality of areas corresponding to the plurality of assets, the plurality of areas presenting the allocation ratios of the plurality of assets as a function of time; and a plurality of risk factor indicators overlaying the plurality of areas, the plurality of risk factor indicators indicating the future date as a function of time and the risk strength;

generating, by utilizing the computer processor, a graphical display onto the GUI configured to provide a visual depiction of the generated glide path map and a recommended change in the allocation ratios of the plurality of assets to the participant, wherein the visual depiction of the glide path map illustrates various risks by corresponding representation of a circle, wherein the diameter of the circle is proportionally related to the strength of the risk factor, wherein the diameter of a particular risk factor is configured to change proportionally as the strength of a particular risk factor changes over time, and wherein the computer processor is configured to calculate risk ratings for the investment portfolio using the generated glide path and specific date and strength of a certain risk and determine a risk rank from the calculated risk rating;

monitoring, by utilizing the computer processor, the first risk factors and the second risk factors to identify a change in the first risk factors and the second risk factors;

identifying, by utilizing the computer processor, a change in at least one of the first risk factors or the second risk factors;

updating, by utilizing the computer processor, the allocation ratios of the plurality assets based on the identified change in at least one of the first risk factors or second risk factors and displaying an updated glide path map based on the updated allocation ratios of the plurality of assets;

accumulating, by utilizing the computer processor, the allocation ratios of assets in the investment plan portfolio and risk factors in one module thereby improving network resource usage efficiency; and generating, by utilizing the computer processor, the glide path map in a centralized location of a system;

generating, by utilizing the computer processor, a historical index return for the investment plan portfolio based on at least one asset allocation for the investment plan portfolio;

forecasting, by utilizing the computer processor, future potential returns of the investment portfolio based on the historical index return for the investment plan portfolio and at least one of the first risk factors or second risk factors;

calculating, by utilizing the computer processor, the change in the allocation ratios of the plurality of assets as a function of time based on the first risk factors, the second risk factors, and a Monte Carlo simulation resulting in the glide path data;

adjusting, by utilizing the computer processor, any future allocation ratios resulting from the Monte Carlo simulation calculation based on the forecasted future potential returns of the investment portfolio; and displaying, by utilizing the computer processor, the allocation ratios on the GUI based on the adjustment.

7. The method of claim 6, wherein the first risk factors associated with the market conditions comprises:

an inflation risk indicating a risk that a principal of the investment plan portfolio will be eroded by inflation;

an interest rate risk indicating a sensitivity of the investment plan portfolio to rising interest rates;

a market risk indicating a risk of a capital loss or an investment loss to the investment plan portfolio of the participant due to market volatility;

an event risk indicating a risk of loss of the principal of the investment plan portfolio due to a market event; and a longevity risk indicating a risk the participant will outlive the plurality of assets of the investment plan portfolio.

8. The method of claim 7, further comprising:
generating an inflation risk rating based on the glide path data and the inflation risk;
generating an interest rate risk rating based on the glide path data and the interest rate risk;
generating a market risk rating based on the glide path data and the market risk; generating an event risk rating based on the glide path data and the event risk; and generating a longevity risk rating based on the glide path data and the longevity risk.

9. The method of claim 6, wherein the second risk factors associated with the market conditions comprises:
a participant-user risk indicating a risk that the participant misuses a principal of the investment plan portfolio;
a withdrawal rate risk indicating a risk that the participant withdraws the principal of the investment plan portfolio prior to retirement; and
an accumulation risk indicating a risk that the participant will outlive the principal of the investment plan portfolio.

10. The method of claim 6, further comprising:
accessing a historical index return for the investment plan portfolio; and
calculating the change in the allocation ratios of the plurality of assets as a function of time based on the first risk factors, the second risk factors, and the historical index return for the investment plan portfolio resulting in the glide path data.

11. A non-transitory computer readable medium comprising programming logic for simulating an investment plan portfolio of a participant and a plurality of risk factors, detecting a change in risk factors, and managing risk in the investment plan portfolio, the programming logic, when executed by a processor, is operable to:
access portfolio data related to an investment plan portfolio of a participant, the portfolio data comprising allocation ratios of a plurality of assets of the investment plan portfolio;
define first risk factors associated with market conditions, wherein the first risk factors include a future date and a risk strength;
define second risk factors associated with the participant;
display a change in the allocation ratios of the plurality of assets as a function of time based on the first risk factors and the second risk factors resulting in glide path data;
generate a glide path map based at least partially on the resulting glide path data, the glide path map providing a visual depiction of a change in the allocation ratios of the plurality of assets over time, wherein the glide path map includes an area graph including:
a plurality of areas corresponding to the plurality of assets, the plurality of areas presenting the allocation ratios of the plurality of assets as a function of time; and
a plurality of risk factor indicators overlaying the plurality of areas, the plurality of risk factor indicators indicating the future date as a function of time and the risk strength;
generate a graphical display onto a graphical user interface (GUI) configured to provide a visual depiction of the generated glide path map and a recommended change in the allocation ratios of the plurality of assets to the participant, wherein the visual depiction of the glide path map illustrates various risks by corresponding representation of a circle, wherein the diameter of the circle is proportionally related to the strength of the risk factor, wherein the diameter of a particular risk factor is configured to change proportionally as the strength of a particular risk factor changes over time, and wherein the programming logic, when executed by the processor, is further operable to calculate risk ratings for the investment portfolio using the generated glide path and specific date and strength of a certain risk and determine a risk rank from the calculated risk rating;
monitor the first risk factors and the second risk factors to identify a change in the first risk factors and the second risk factors;
identify a change in at least one of the first risk factors or the second risk factors; and
update the allocation ratios of the plurality assets based on the identified change in at least one of the first risk factors or second risk factors and display an updated glide path map based on the updated allocation ratios of the plurality of assets;
accumulate the allocation ratios of assets in the investment plan portfolio and risk factors in one module thereby improving network resource usage efficiency; and
generate the glide path map in a centralized location of a system, and
wherein the programming logic, when executed by the processor, is further operable to:
generate a historical index return for the investment plan portfolio based at least partially on at least one asset allocation for the investment plan portfolio;
forecast future potential returns of the investment portfolio based at least partially on the historical index return for the investment plan portfolio and at least one of the first risk factors or second risk factors;
calculate the change in the allocation ratios of the plurality of assets as a function of time based at least partially on the first risk factors, the second risk factors, and a Monte Carlo simulation resulting in the glide path data;
adjust any future allocation ratios resulting from the Monte Carlo simulation calculation based on the forecasted future potential returns of the investment portfolio; and
display the allocation ratios on the GUI based on the adjustment.

12. The computer readable medium of claim 11, wherein the first risk factors associated with the market conditions comprises:
an inflation risk indicating a risk that a principal of the investment plan portfolio will be eroded by inflation;
an interest rate risk indicating a sensitivity of the investment plan portfolio to rising interest rates;
a market risk indicating a risk of a capital loss or an investment loss to the investment plan portfolio of the participant due to market volatility;
an event risk indicating a risk of loss of the principal of the investment plan portfolio due to a market event; and
a longevity risk indicating a risk the participant will outlive the plurality of assets of the investment plan portfolio.

13. The computer readable medium of claim 12, wherein the programming logic is further operable to:
generate an inflation risk rating based on the glide path data and the inflation risk; generate an interest rate risk rating based on the glide path data and the interest rate risk;
generate a market risk rating based on the glide path data and the market risk; generate an event risk rating based on the glide path data and the event risk; and generate a longevity risk rating based on the glide path data and the longevity risk.

14. The computer readable medium of claim 12, wherein the programming logic is further operable to:
receive a historical index return for the investment plan portfolio; and
calculate the change in the allocation ratios of the plurality of assets as a function of time based at least partially on the first risk factors, the second risk factors, and the historical index return for the investment plan portfolio.

15. The computer readable medium of claim 11, wherein: the second risk factors associated with the market conditions comprises: a participant-user risk, wherein the participant-user risk indicates a risk that the participant misuses a principal of the investment plan portfolio;
a withdrawal rate risk, wherein the withdrawal rate risk indicates a risk that the participant withdraws the principal of the investment plan portfolio prior to retirement; and
an accumulation risk, wherein the accumulation risk indicates a risk that the participant will outlive the principal of the investment plan portfolio.

\* \* \* \* \*